United States Patent
Bean et al.

(10) Patent No.: US 7,428,582 B2
(45) Date of Patent: Sep. 23, 2008

(54) SEMANTIC INTERFACE FOR PUBLISHING A WEB SERVICE TO AND DISCOVERING A WEB SERVICE FROM A WEB SERVICE REGISTRY

(75) Inventors: James D. Bean, Phoenix, AZ (US); Robert E. Morgan, Glendale, AZ (US)

(73) Assignee: American Express Travel Related Services Company, Inc, New York, NY (US)

(*) Notice: Subject to any disclaimer, the term of this patent is extended or adjusted under 35 U.S.C. 154(b) by 509 days.

(21) Appl. No.: 11/275,391

(22) Filed: Dec. 29, 2005

(65) Prior Publication Data

US 2007/0168479 A1 Jul. 19, 2007

(51) Int. Cl.
*G06F 15/16* (2006.01)

(52) U.S. Cl. .................... 709/218; 709/246

(58) Field of Classification Search ......... 709/200–203, 709/217–227, 246
See application file for complete search history.

(56) References Cited

U.S. PATENT DOCUMENTS

| | | | | |
|---|---|---|---|---|
| 6,151,624 | A | 11/2000 | Teare et al. | 709/217 |
| 6,584,507 | B1 | 6/2003 | Bradley et al. | 709/229 |
| 6,594,700 | B1 | 7/2003 | Graham et al. | 709/230 |
| 6,604,237 | B1 | 8/2003 | Giammaria | 717/174 |
| 6,708,217 | B1 | 3/2004 | Colson et al. | 709/231 |
| 6,845,396 | B1 | 1/2005 | Kanojia et al. | 709/224 |
| 7,188,114 | B2 * | 3/2007 | Liu et al. | 707/100 |
| 7,249,100 | B2 * | 7/2007 | Murto et al. | 705/50 |
| 2002/0143819 | A1 | 10/2002 | Han et al. | 715/513 |
| 2003/0051067 | A1 * | 3/2003 | Johnson | 709/318 |
| 2003/0065805 | A1 * | 4/2003 | Barnes, Jr. | 709/231 |
| 2003/0163694 | A1 | 8/2003 | Chen et al. | 713/170 |
| 2003/0191677 | A1 * | 10/2003 | Akkiraju et al. | 705/8 |
| 2003/0225894 | A1 * | 12/2003 | Ito | 709/227 |
| 2004/0003032 | A1 * | 1/2004 | Ma et al. | 709/203 |
| 2004/0030627 | A1 | 2/2004 | Sedukhin | 705/36 R |
| 2004/0030740 | A1 | 2/2004 | Stelting | 709/201 |
| 2004/0088713 | A1 | 5/2004 | Myllymaki et al. | 719/315 |
| 2004/0128345 | A1 | 7/2004 | Robinson et al. | 709/203 |
| 2004/0128622 | A1 | 7/2004 | Mountain et al. | 715/530 |
| 2004/0128670 | A1 | 7/2004 | Robinson et al. | 718/1 |
| 2004/0186897 | A1 | 9/2004 | Knauerhase et al. | 709/209 |
| 2004/0205613 | A1 | 10/2004 | Li et al. | 715/523 |
| 2004/0213409 | A1 * | 10/2004 | Murto et al. | 380/258 |

(Continued)

OTHER PUBLICATIONS

"Intentional SOA for Real-World SOA Builders," White Paper, Infravio, Inc., Cupertino, California, Mar. 2005 (www.infravio.com).

(Continued)

*Primary Examiner*—Moustafa M Meky
(74) *Attorney, Agent, or Firm*—Fitzpatrick, Cella, Harper & Scinto

(57) ABSTRACT

A system and method for publishing a web service to a web service registry retrieving a web service description. A schema associated with the web service description is acquired, and publication metadata relating to the web service is extracted from the schema. A web service registry publication request is generated based on the publication metadata extracted from the schema. The web service registry publication request is submitted to the web service registry for publication.

27 Claims, 14 Drawing Sheets

U.S. PATENT DOCUMENTS

| | | | |
|---|---|---|---|
| 2004/0220910 A1 | 11/2004 | Zang et al. | 707/3 |
| 2004/0236633 A1 | 11/2004 | Knauerhase et al. | 705/26 |
| 2005/0021663 A1 | 1/2005 | Knauerhase et al. | 709/217 |
| 2005/0050173 A1 | 3/2005 | Kikuchi | 709/219 |
| 2005/0080837 A1* | 4/2005 | Wieczorek et al. | 709/200 |
| 2005/0086178 A1 | 4/2005 | Xie et al. | 705/80 |
| 2005/0091174 A1 | 4/2005 | Akkiraju et al. | 705/75 |
| 2005/0097224 A1 | 5/2005 | Chen et al. | 709/246 |
| 2005/0198206 A1* | 9/2005 | Miller et al. | 709/219 |
| 2006/0069717 A1* | 3/2006 | Mamou et al. | 709/203 |
| 2006/0233166 A1* | 10/2006 | Bou-Diab et al. | 370/389 |
| 2008/0015916 A1* | 1/2008 | Cossey et al. | 705/7 |

OTHER PUBLICATIONS

"Systinet Registry 6.5 Product Documentation," pp. 145-261, Systinet, Burlington, Massachusetts, 2005 (www.systinet.com).

"Publishing your Services: UDDI," IBM, Peter Schmitz and Jacob Weintraub, Feb. 4, 2003 (www.ibm.com/developerworks).

* cited by examiner

SEMANTIC INTERFACE FOR PUBLISHING A WEB SERVICE TO AND DISCOVERING A WEB SERVICE FROM A WEB SERVICE REGISTRY

BACKGROUND OF THE INVENTION

1. Field of the Invention

The present invention generally relates to a semantic interface for publishing a web service to and discovering a web service from a web service registry, and more particularly to an interface that facilitates publication of a web service by providing contextual information, without manual entry of metadata, and that facilitates discovery of a web service by allowing contextual searching.

2. Related Art

The World Wide Web provides access to a vast amount of information in the form of hypertext markup language (HTML) documents and also provides access to web-based applications, which are software programs, or groups of programs, that provide a particular functionality to the end user, such as database and Internet searching, electronic commerce, banking, travel planning, etc. Such applications are sometimes implemented using "web services", which is a standardized way of integrating web-based application modules.

Unlike traditional client/server models, such as a web server/web page system, web services do not provide a user-interface. Instead, web services share business logic, data, and processes through a programmatic interface across a network, i.e., these web applications interface with one another, rather than the user. Web services are modular, in the sense that they are designed to be added by web application developers to a graphical user-interface (GUI), such as a web page or an application program, to provide the specific functionality of the web service to the user.

Web services allow different applications from different sources to communicate with each other without time-consuming custom programming. Also, because communication between web services is in a common language, Extensible Markup Language (XML), they are not tied to one particular operating system or programming language. For example, applications written in Java can communicate with applications written in Perl, and Windows applications can communicate with UNIX applications.

XML documents may be used in conjunction with XML schemas, which describe and constrain the content of the XML documents. XML schemas are written in an XML-based language, such as the W3C XML Schema Definition Language (the standard defining that language, as adopted by the W3C recommendation of May 2, 2001, is hereby incorporated herein by reference). Schemas create an XML vocabulary for expressing business rules for data contained in XML documents and allows for the "validation" of XML documents, i.e., allow determination of whether the data in the XML document meets the constraints defined in the schema. Such vocabularies may be created such that element and attributes names are associated with a particular "namespace", which is a collection of names that are identified by a uniform resource identifier (URI) reference (the generic term for all types of names and addresses that refer to objects on the World Wide Web). The use namespaces allows XML documents to use elements and attributes that have the same name, but come from different sources.

Web services employ simple object access protocol (SOAP), web services description language (WSDL), and universal description, discovery and integration (UDDI), which are open standards that are designed to be implemented over an Internet protocol backbone. Generally speaking, SOAP is used to encapsulate and formalize the data transferred between web services, WSDL is used to describe the web services interface and technical details, and UDDI acts as a directory of the web services that are available. Used primarily as a means for businesses to communicate with each other and with clients, web services allow organizations to communicate data, without intimate knowledge of each other's computer systems.

SOAP is a lightweight XML-based messaging protocol used to encode the information in web service request and response messages before sending them over a network. SOAP messages are independent of any operating system or protocol and may be transported using a variety of Internet protocols, including simple mail transfer protocol (SMTP), multipurpose Internet mail extensions (MIME), and hypertext transfer protocol (HTTP).

WSDL is an XML-formatted language used to describe the web service as a collection of communication endpoints capable of exchanging messages, and the interface and technical details for doing so. As the service interface specification, WSDL is an important part of the UDDI registry model, which is an XML-based worldwide business registry of web services. UDDI is implemented as a web-based, distributed directory that enables businesses to list themselves and their available web service on the Internet and "discover" each other, in a manner analogous to a traditional phone book's yellow and white pages.

Referring to FIG. 1, web services may be registered, or "published", in a UDDI web service registry 110, by a the web service provider 120. UDDI is a specification for one or more web-based registries that provide information about a business or other entity and its technical interfaces, that is, its application program interfaces (APIs), which are the set of routines, protocols, and tools for building software applications. By accessing a public UDDI operator site, a web service requestor 130 or other user can search for information about web services that are made available by or on behalf of a business. This information allows others to discover what technical programming interfaces are provided for interacting with a business for purposes such as electronic commerce, etc. The web service requestor can then bind the desired web service to a web application using the information acquired from the web service registry and from the WSDL.

The information that a business or other entity can register using UDDI includes several kinds of simple data that help others determine how to access the business' web services, the functions that those services perform, and how to access the services. For example, this information typically includes business name, business identifiers (e.g., D&B D-U-N-S Number®, etc.), and other contact information. The information also includes classification information, such as industry codes and product classifications, as well as descriptive information about the services that the business makes available. The registered information also includes the location of web services by providing a uniform resource identifier (URI), uniform resource locator (URL), email address, etc., through which each web service is accessed.

In the past, to build compatible software, two companies only had to agree to use the same specification, and then test their software. By contrast, web services are designed to be shared on an ad hoc basis. Therefore, web service programmers need a way to distinctly identify public specifications (or, alternatively, private specifications shared only with select partners), so that these specifications are discoverable by web service users. This identifying information relating to the specifications, or metadata, is provided by the tModel within UDDI. Thus, the tModel mechanism facilitates discovering information about services and other technical foundation concepts for web services that are intended by a business or other entity to be exposed for broad use.

For example, a business may buy a software package that allows automatic acceptance of electronic orders via the Internet. The business could "advertise" the availability of this electronic commerce capability using one of the public UDDI operator sites, so that potential business partners and customers could find out that they can accept orders electronically. In addition, the software may be configured to automatically consult one of the public UDDI sites and identify compatible business partners, by looking up businesses identified by the user and determining which ones have already advertised support for the electronic commerce services provided by the software package.

The software package may accomplish this by taking advantage of the fact that a tModel has been registered within UDDI and a corresponding tModel key ("tModelKey") is assigned at the time of registration. This tModel represents the technical details for the electronic commerce capability. Individual partner capabilities are stored within UDDI as information about "service bindings", each of these bindings references the tModel that represents or references the specific interface that the software package understands.

The tModel keys within a services binding description may be thought of as a fingerprint that can be used to trace the compatibility origins of a given web service. Since many such services will be constructed or pre-programmed to be compatible with a given, well-known interface, references to the tModel serve to identify the properties associated with a given service. For software companies and programmers, tModels provide a common point of reference that allows technical details of the service to be registered, and compatible implementations of those services to be easily identified. For businesses, the tModel greatly reduces the work in determining which particular bindings exposed by a business partner are compatible with the software used in within the business. Finally, for standards organizations, the ability to register information about a specification and then find implementations of web services that are compatible with a standard helps customers immediately realize the benefits of a widely used design.

As noted above, UDDI registry entries may specify one or more classifications, or category codes for the business entity publishing the web service, such as, for example, NAICS, UN/SPC, and SIC codes, etc. Other classification systems designate geographic information or membership in a given organization. This classification information, in turn, allows simple searching, such as Boolean key-word searching, to be done on the information contained in the public registries.

Among the shortcomings of such conventional approaches to web registry publication and discovery is that the web provider must manually enter the publication information (e.g., the classification information) and such information does not provide a contextual basis for semantic-based searching. For example, a keyword search may be performed for a web service to compute a "balance summary" for a financial transaction instrument such as a corporate card. However, because the search terms "balance summary" are applicable in many different business areas, the search may return too many results to be useful, even when the search is limited to specific business classifications.

To supplement the system of classification by predefined categories, such as industry codes, product codes, geography codes and business identification codes (such as D&B D-U-N-S Numbers®), etc., UDDI allows other search services to use this core classification information as a starting point to provide contextual indexing and classification. This capability allows a business to extend the support that UDDI operators provide for managing validated taxonomies, by allowing third parties to create and check taxonomies.

"Unchecked" taxonomies also may be used for categorization and identification without the need for UDDI to perform a specific call-out to a validation service. Organizations that choose to make a particular taxonomy available for categorization or identification can register it as an unchecked taxonomy. Unchecked taxonomies are registered by simply registering a new tModel and classifying that tModel as either an identifier or a categorization taxonomy. On the other hand, "checked" taxonomies may be created from these new taxonomies, if the publisher of a new taxonomy wishes to make sure that the categorization code values or identifiers being registered represent accurate and validated information.

UDDI also supports third parties who wish to maintain augmented UDDI registries, which include additional descriptive information that does not fit into the standard UDDI framework. For example, Infravio (http://www.infravio.com) provides a UDDI-based registry-repository platform for service oriented architectures (SOA), which are interrelated collections of web services.

However, a significant shortcoming of these approaches is that they require manual entry and updating of the tModel or supplemental registry information after the web service has been created. Often, such information changes over time as a web service is modified or used in new contexts. However, the tModel or augmented UDDI registries must then be manually updated to reflect such changes.

Another approach to providing enhanced discovery capabilities for those seeking web services is to provide a semantics-based searching capability, which seeks to specify the meaning of the resources described on the Web. For example, the "Semantic Web" is a collaborative effort led by W3C that seeks to provide a common framework that allows data to be shared and reused across application, enterprise, and community boundaries. It is largely based on the resource description framework (RDF), which integrates a variety of applications using XML for syntax and URIs for naming.

RDF is a language for representing information about resources in the World Wide Web. It is particularly intended for representing metadata about web resources, such as the title, author, and modification date of a web page, copyright and licensing information about a web document, or the availability schedule for some shared resource. However, by generalizing the concept of a "web resource", RDF can also be used to represent information about things that can be identified on the Web, even when they cannot be directly retrieved on the Web. Examples include information about items available from on-line shopping facilities (e.g., information about specifications, prices, and availability), or the description of a Web user's preferences for information delivery.

RDF is intended for situations in which this information needs to be processed by applications, rather than being only displayed to people. RDF provides a common framework for expressing this information so it can be exchanged between applications without loss of meaning. Since it is a common framework, application designers can leverage the availability of common RDF parsers and processing tools. The ability to exchange information between different applications means that the information may be made available to applications other than those for which it was originally created.

The web ontology language (OWL) is a language for defining and instantiating web ontologies. "Ontology" refers to the science of describing the kinds of entities in the world and how they are related. An OWL ontology may include descriptions of classes, properties and their instances. Given such an ontology, the OWL formal semantics specifies how to derive its logical consequences, that is, facts not literally present in the ontology, but entailed by the semantics. These entailments may be based on a single document or multiple distributed documents that have been combined using defined OWL mechanisms. While there are logical synergies between the semantics of RDF and OWL, OWL extends the notion to relationships of things and the relationships of the data that describe them. Although a powerful tool, RDF tends to be focused on the descriptive framework and namespace for an artifact. One approach is to use RDF as the framework in which to declare one's metadata for an artifact, potentially taking advantage of standards from several sources such as Dublin Core Metadata Initiative (DCMI) and OWL.

An ontology differs from an XML schema in that it is a knowledge representation, where an XML Schema is a set of declaratives and constraints that describe an XML message format. Most industry-based web standards consist of a combination of message formats and protocol specifications. These formats have been given an operational semantics, such as, for example, "upon receipt of this PurchaseOrder message, transfer Amount dollars from AccountFrom to AccountTo and ship Product." But this specification is not designed to support reasoning outside the transaction context. Thus, a general advantage of the onotological approach is the availability of tools that provide generic support that is not specific to the particular subject domain, in contrast to a system based on a specific industry-standard XML schema.

However, semantic-based approaches still rely on a manually-entered set of keywords or classification information for each web service, which must be manually updated to reflect any changes in the functionality of the web service. The generic onotologies created under such semantic-based approaches may not be well-suited for a particular industry. Moreover, the creation of these onotological associations is generally a static process outside the control of the publisher of the web service.

Given the foregoing, what is needed is a system, method and computer program product for describing a semantic interface for publishing a web service to and discovering a web service from a web service registry. More specifically, what is needed is a system for augmenting the basic UDDI registry to include contextual information in a manner that is controllable and updateable by the web service publisher, without requiring manual entry and monitoring of the registry information.

BRIEF SUMMARY OF THE INVENTION

The present invention provides a method, system and computer program product that serve as such a semantic interface tool.

Among other important features of the invention are retrieving a web service description, acquiring a schema associated with the web service description, and extracting publication metadata relating to the web service from the schema. A web service registry publication request is generated based on the publication metadata extracted from the schema, and the web service registry publication request is submitted to the web service registry for publication.

The web service registry may be a universal description, discovery and integration (UDDI) registry.

An additional feature may be validating the publication metadata against a predefined semantic standard, prior to the generation of the web service registry publication request. In such instance, the semantic standard may be based on resource description framework (RDF), or on web ontology language (OWL).

Another additional feature may be presenting the web service registry publication request to a user for review and editing, prior to the submission to the web service registry. In addition, the mentioned schema may be an extensible markup language (XML) schema, and if so, the publication metadata may be extracted from the XML schema based on a user-defined parameter from a corresponding one of a plurality of levels defined by the XML schema. In particular, the levels defined by the XML schema may comprise an annotation/appinfo schema level, an annotation/documentation schema level, a schema adjunct framework level, an annotation/appinfo container level, an annotation/documentation container level, and a discrete type-description.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

I. Overview

The present invention is directed to a system, method and computer program product for a semantic interface for publishing a web service to and discovering a web service from a web service registry. The present invention is now described in more detail herein in terms of the examples below, which relate to publication to and discovery from UDDI-based web service registries. This is for convenience only and is not intended to limit the application of the present invention. In fact, after reading the following description, it will be apparent to one skilled in the relevant art(s) how to implement the following invention in various alternative embodiments.

The terms "user," "end user", "provider", "requester," and the plural form of these terms are used throughout the description to refer to those persons or entities capable of accessing, using, being affected by and/or benefiting from the present invention.

A "transaction account", as used herein, may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial transaction instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

II. System

Figure 1:
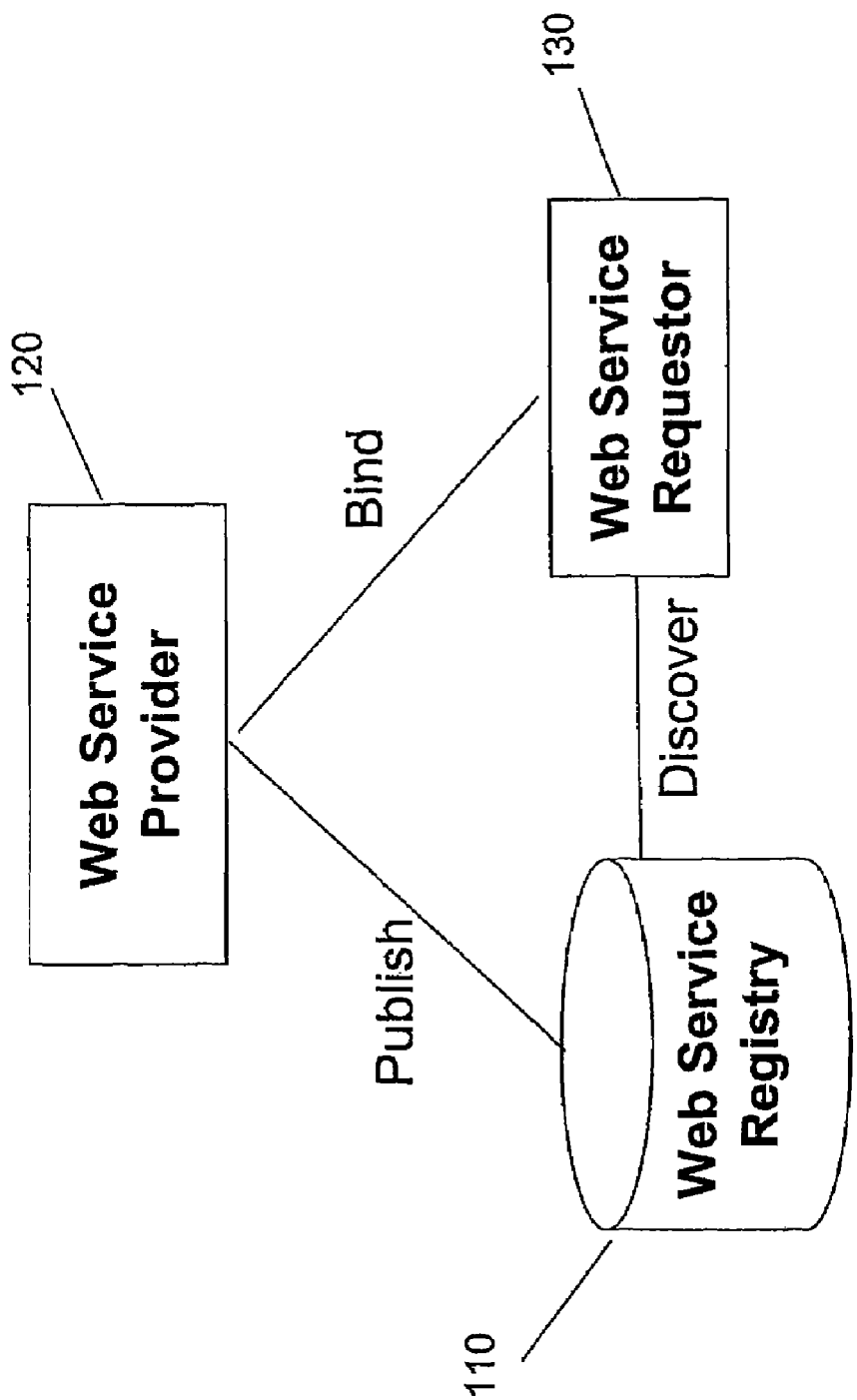
FIG. 1 is a block diagram of a conventional system in which a web service provider publishes a web service to a registry, and a web service requestor discovers a web service from the registry.
Figure 2:
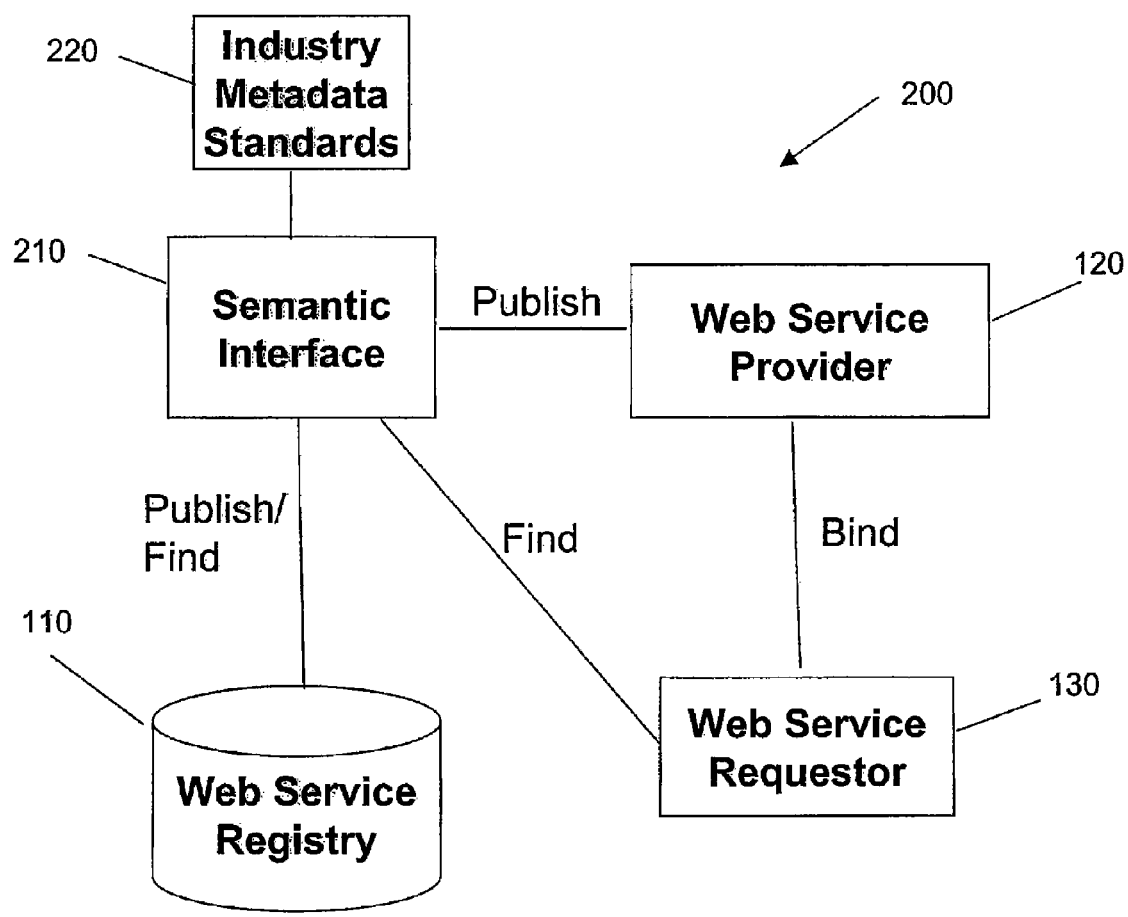
FIG. 2 is a system block diagram of an exemplary embodiment of the present invention.

FIG. 2 shows a block diagram of an exemplary system 200 implementing an embodiment of the present invention. System 200 includes a web service registry 110, for example, a UDDI registry, that stores information relating to web services. The information is published to the web registry 110 by a web service provider 120, who may be, for example, the developer, owner, or source of the web service. A business or other entity seeking to access a particular web service (i.e., a web service requester 130), would find information in the web service registry 110 by submitting a discovery request. Based on the information thus obtained, the requestor 130 can access the web service, (or "bind" to the web service) by directly accessing the web service infrastructure of the web service provider 120.

The publication of the web service information by the provider 120 and the discovery of the web service information by the requester 130 is facilitated by a semantic interface 210, which passes the publication and discovery requests to the registry 110 and returns the resulting information to the provider 120 and the requester 130.

As discussed above, with conventional registry publication, the web service provider 120 manually enters the registry information in a publication request, and the web service requester 130 creates a discovery request based on keywords. By contrast, the semantic interface 210 extracts the registry information from the web service itself (e.g., from an associated XML schema), and automatically populates the publication request with the extracted metadata.

The extraction of the publication metadata from the web service allows the publication request to be created without manual entry of data. It also allows the publication metadata to be defined by the creators of the web service at the time the web service is created, rather than after the fact. Thus, the publication metadata are created by those having intimate knowledge of the web service and its specific intended functionality. The publication metadata, includes contextual information, such as categories and sub-categories that more specifically identify the functionality of the web service.

The semantic interface 210 compares the extracted contextual information with industry metadata standards 220, such as for example, the Dublin Core Metadata Initiative (DCMI) RDF or OWL. Among other functions, the semantic interface 210 provides a graphical user interface (GUI) for the formation of publication and discovery requests based on the contextual information. For example, the GUI provides a web service requester 130, seeking to form a discovery request, menus of category choices based on the metadata extracted from the web services to be searched.

III. Process

Figure 3:
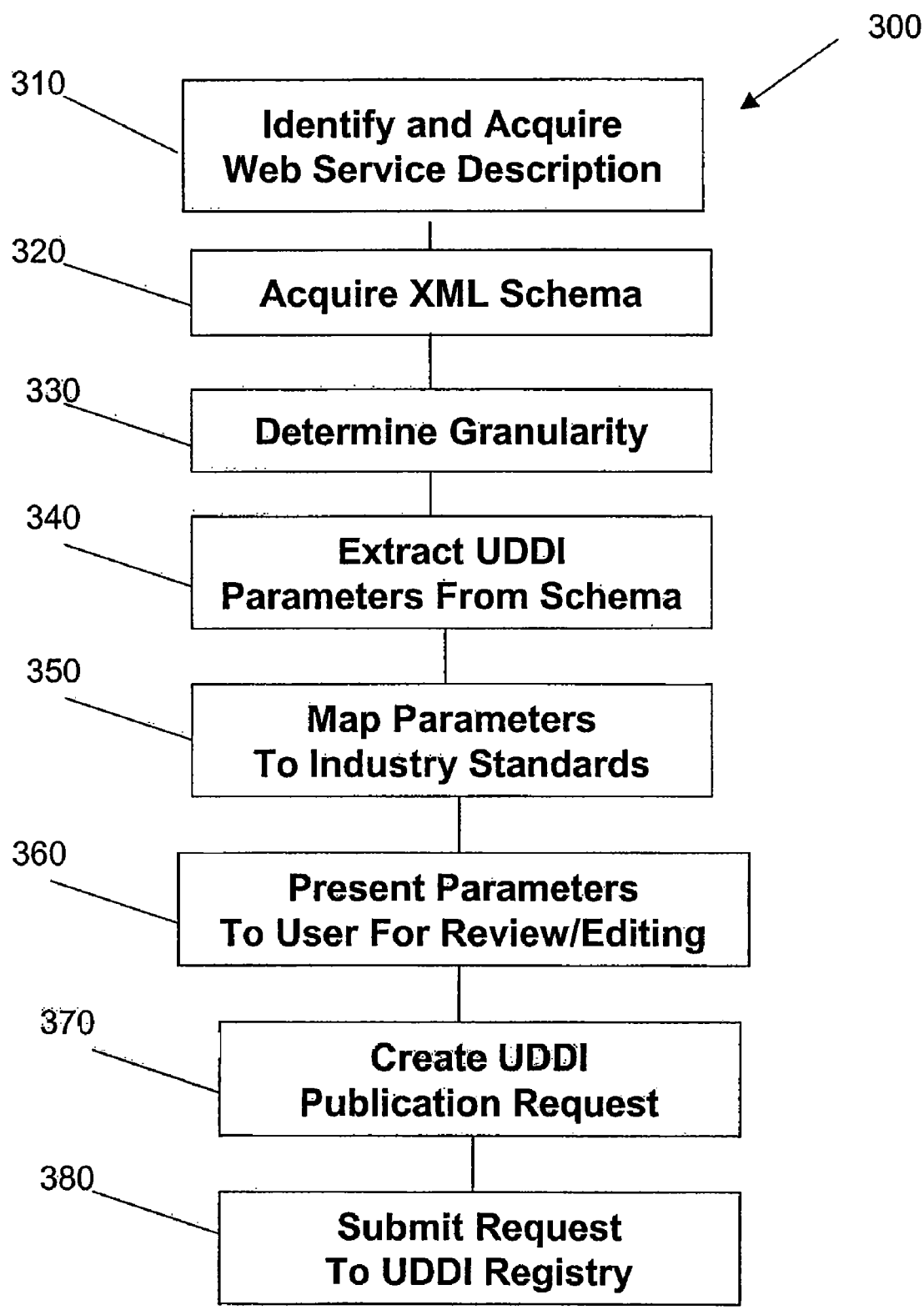
FIG. 3 is a flowchart illustrating a process for publishing a web service to a web service registry in accordance with an embodiment of the present invention.

FIG. 3 shows a flowchart illustrating a process 300, according to one embodiment of the present invention, for publishing a web service to a web service registry using a semantic interface 210, as described above with respect to FIG. 2. In process 300, a description of the web service to be published is identified and acquired (step 310). The description may be, for example, a WSDL file. A file containing the publication metadata, for example, an XML schema, is acquired (step 320). For example the WSDL file may contain an XML Schemas import command within the WSDL "types" that refers to the XML schema.

The imported XML schema is analyzed and the granularity parameter relating to the publication metadata is used to determine the granularity and type of metadata that should be acquired from the XML Schema (step 330). The granularity parameter, which is discussed in further detail below, defines a level at which the publication metadata are acquired and formatted for publication. The publication metadata are extracted from the schema based on the granularity parameter (step 340) and compared to industry metadata standards (step 350).

The publication metadata is presented to the user, e.g., the person seeking to publish the web service, via a GUI, so that the user may review and edit the information (step 360). This allows the user to review any changes made to the metadata based on the comparison to the industry standards (such changes may be highlighted or otherwise marked on the GUI). Any changes made by the user to the publication metadata using the GUI also may be used to optionally update the metadata stored in the XML Schema. Once the user is satisfied with the publication parameters, a UDDI publication request is formed (step 370) based on the approved information and submitted for publication to the UDDI registry (step 380).

Figure 4:
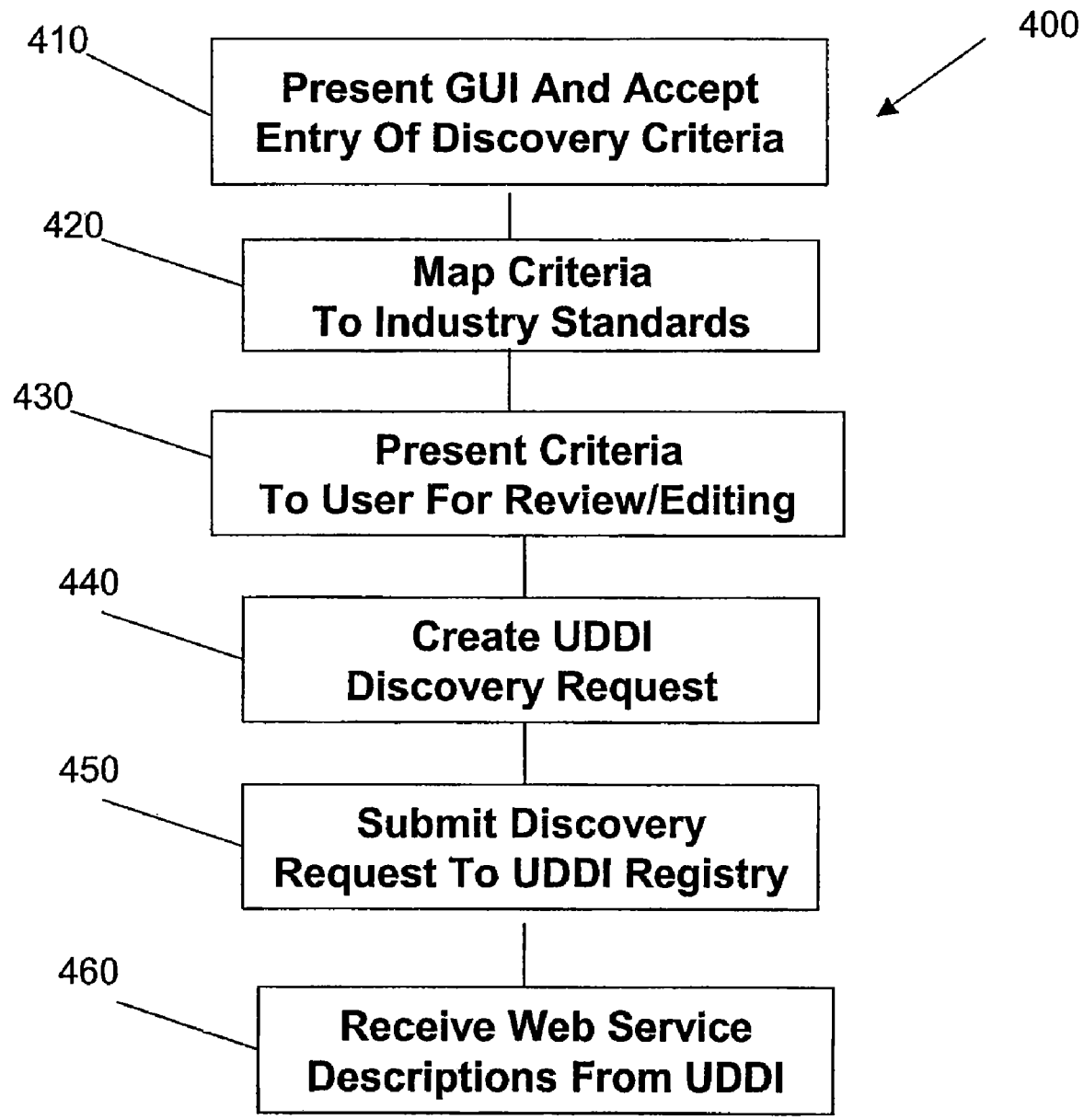
FIG. 4 is a flowchart illustrating a process for discovering a web service from a web service registry in accordance with an embodiment of the present invention.

FIG. 4 shows a flowchart illustrating a process 400, according to one embodiment of the present invention, for discovering a web service from a web service registry using a semantic interface 210, as described above with respect to FIG. 2. In process 400, a GUI is presented to the user (e.g., the person seeking to find a web service), and the user enters the desired discovery criteria (step 410). The GUI may present the criteria as a combination of predetermined menus and user-defined parameters. The criteria are mapped to industry metadata standards (step 420) and presented to the user for review and editing (step 430).

Once the user is satisfied with the discovery criteria, a UDDI discovery request is formed (step 440) and submitted to the UDDI registry (step 450). The web service descriptions and references to the service interface exposed as a WSDL resulting from the discovery request are returned by the UDDI registry and presented to the user (step 460).

IV. Example Implementations

Figure 5:
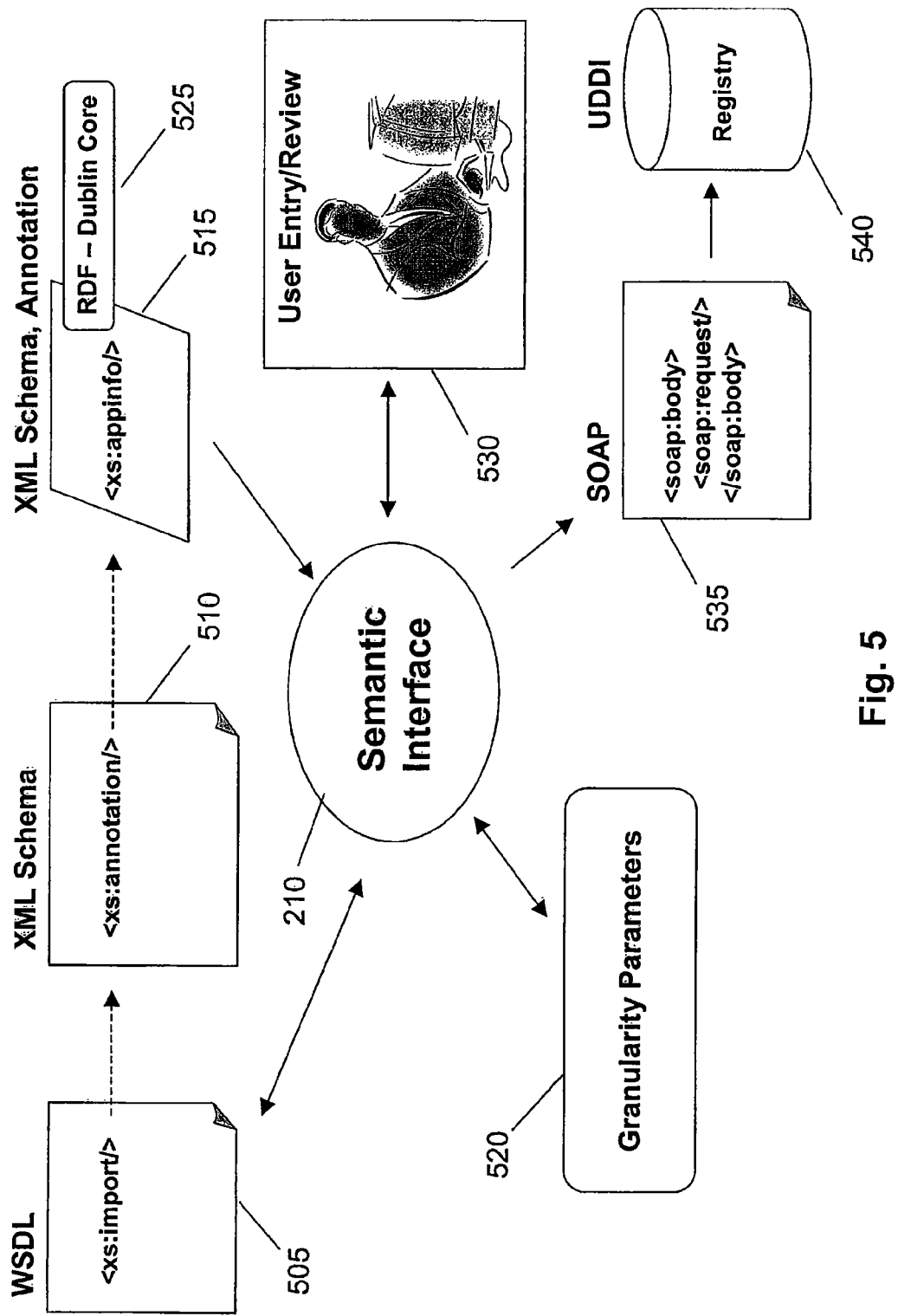
FIG. 5 is a block diagram illustrating publication of a web service to a UDDI registry using a semantic interface in accordance with an embodiment of the present invention.
Figure 6:
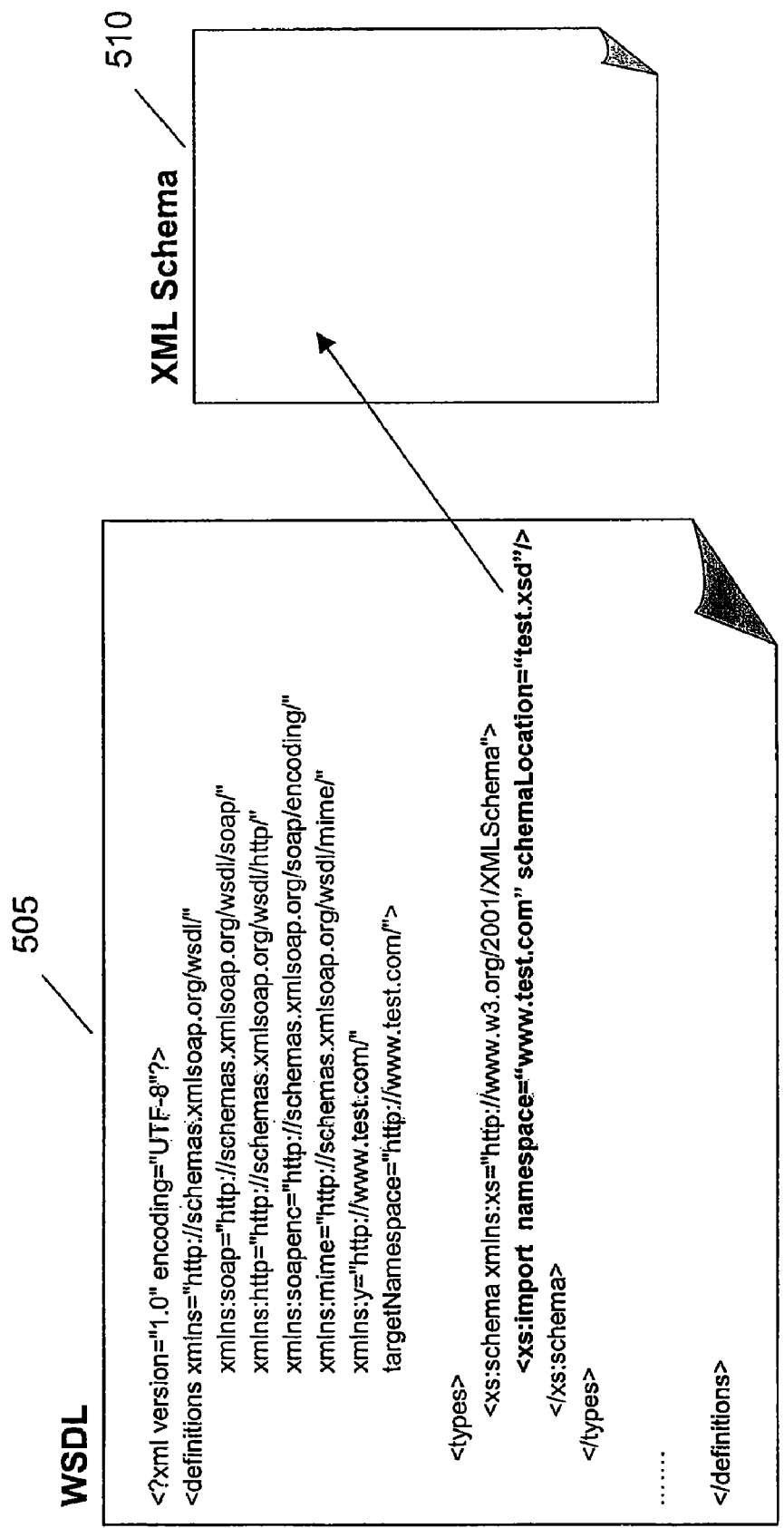
FIG. 6 is a block diagram illustrating acquisition of an XML schema based on a WSDL web service description in accordance with an embodiment of the present invention.

FIG. 5 shows an example of an embodiment of the present invention in which a user is preparing a UDDI publication request using the semantic interface 210. The web service to be published is described in a WSDL file 505, which refers to an XML schema 510 containing publication metadata, e.g., in an "appinfo" sub-section of an "annotation" section 515 of the schema 510. FIG. 6 shows a partial example of a WSDL file having an import statement that references the XML schema and provides the namespace and location of the schema artifact. Referring again to FIG. 5, the publication metadata is extracted from the schema in accordance with the granularity parameters 520. The publication metadata is validated against industry metadata standards, e.g., RDF - Dublin Core 525, and reviewed and edited by the user 530. The semantic interface 210 forms a UDDI publication request, e.g., a SOAP request 535, and submits it to the UDDI registry 540.

Figure 7:
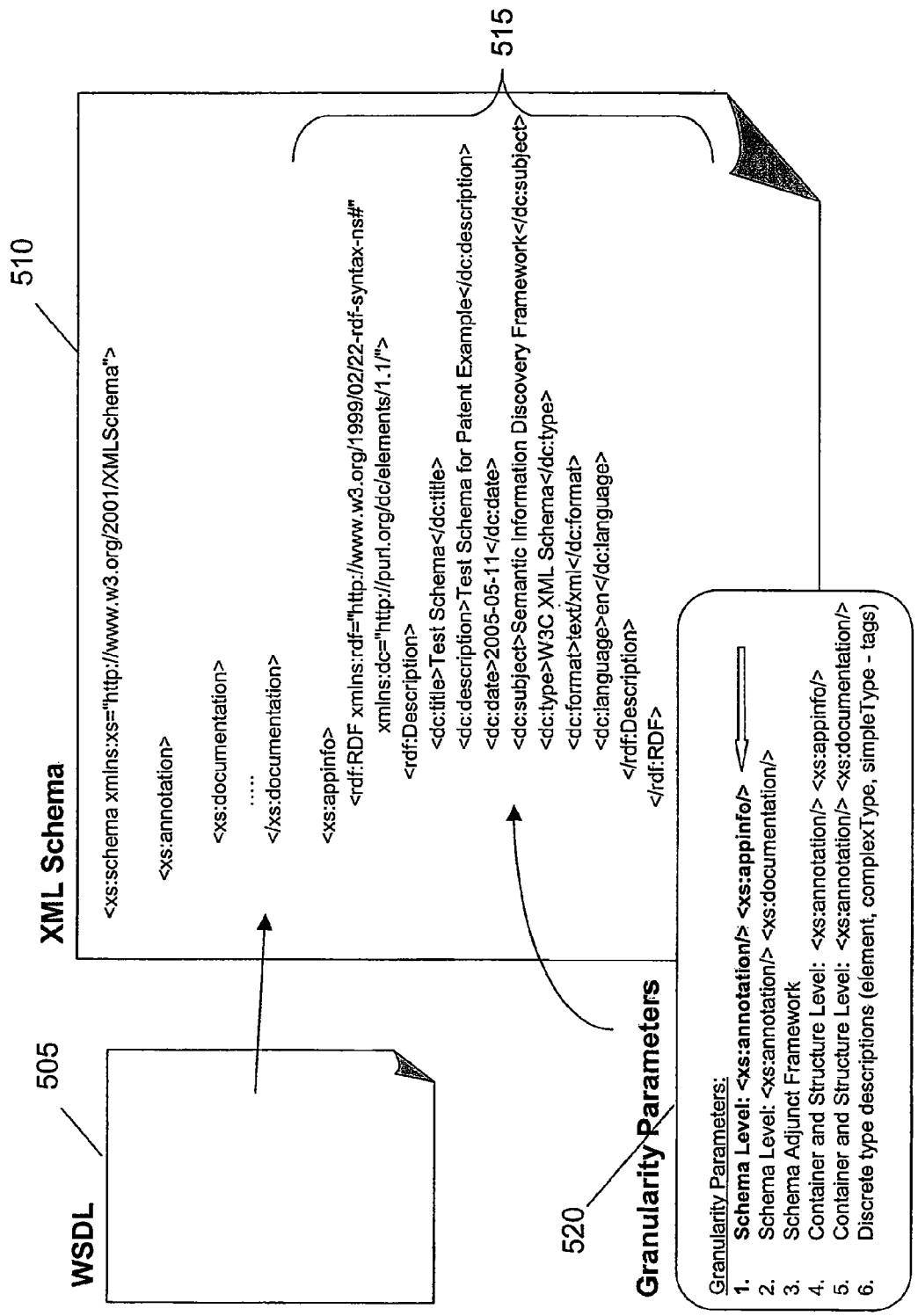
FIG. 7 is a block diagram illustrating extraction of UDDI publication metadata from an XML schema based on a granularity parameter in accordance with an embodiment of the present invention.

FIG. 7 shows a partial example of an XML schema 510 that includes UDDI publication metadata in an "appinfo" section 515. The metadata include RDF-compliant terms, such as "title", "description", "date", "subject", "type", "format", and "language". In this example, the granularity parameter=1, which indicates that the metadata are provided in the schema level application/appinfo section of the XML Schema. Alternatively, the metadata may be provided in the application/documentation section of the schema (granularity parameter=2).

The publication metadata need not be stored at the schema level. For example, the metadata may be stored in a schema adjunct framework, at the container and structure level (e.g., annotation/ appinfo or annotation/documentation), or as discrete type descriptions (e.g., element, complexType, or simpleType tags). (The Schema Adjunct Framework (SAF) is defined in a technical note submitted to the W3C by Extensibility. The intent is to add semantic and behavioral characteristics via reference (primarily external reference) from an XML Schema to the requisite artifact. Based upon the granularity parameter, this set of "additional" metadata would be a candidate for extraction, edit by the user, and then insertion into the publication metadata as appropriate. The document "Notes on schema annotation", C. M. Sperberg-McQueen, Feb. 12, 2002, rev. Apr. 12, 2002, note added Jan. 30, 2003, is incorporated herein by reference, as are each of the six references listed in the "References" section of that document.) Any of these structures or declarations may be used as a source for publication metadata. The granularity parameter or parameters provide an indication as to which declarations or structures are used. The granularity parameter is stored by the SIDF infrastructure and used by the GUI and extraction logic.

Figure 8:
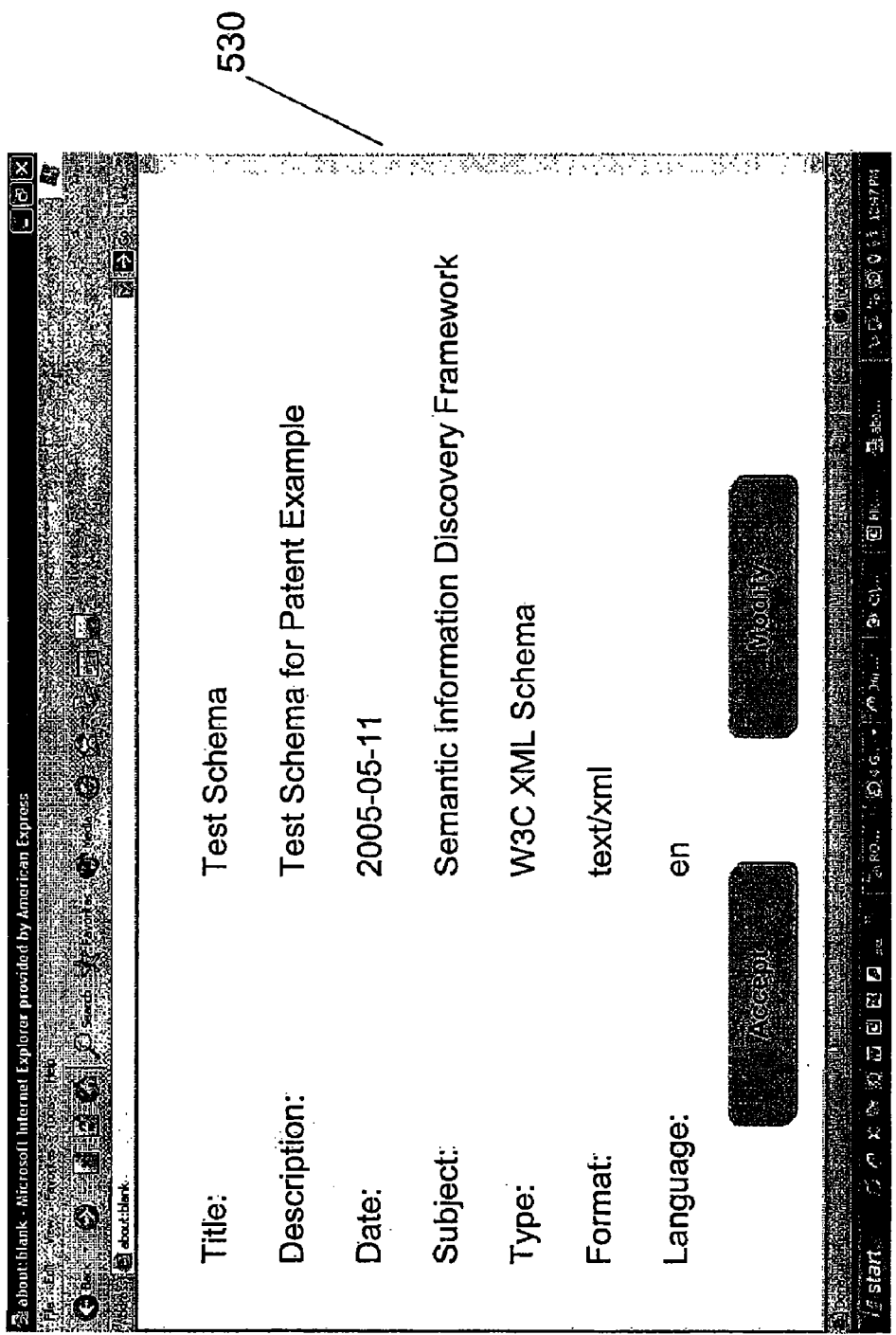
FIG. 8 illustrates a graphical user interface for reviewing and editing UDDI publication parameters in accordance with an embodiment of the present invention.

FIG. 8 shows an example of a GUI 530 that is presented to the user to allow review and editing of the UDDI publication parameters extracted from the XML schema. This allows the user to make modifications to the parameters before the publication request is submitted to the UDDI registry. For example, the validation of the parameters with industry metadata standards may result in changes to the parameters, and such changes may be marked with an indicator on the GUI to alert the user. The user may then accept these changes or may make modifications to the parameters as necessary.

Figure 9:
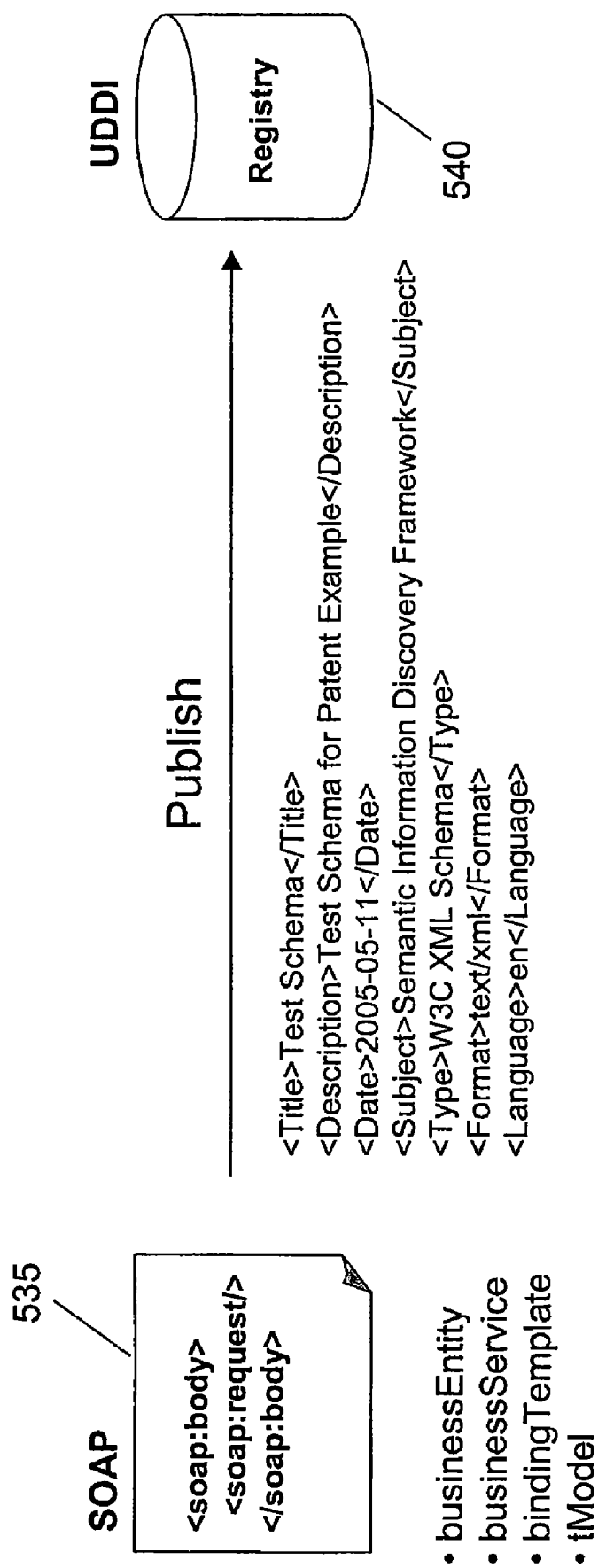
FIG. 9 is a block diagram illustrating the publication of a web service to a UDDI registry using SOAP in accordance with an embodiment of the present invention.

FIG. 9 illustrates the publication of the web service to the UDDI registry 540 using a SOAP request 535 formed by the semantic interface 210. The SOAP request 535 contains certain UDDI data structure information that are used to create, i.e., publish, an entry for the web service in the UDDI registry 540: businessEntity, businessService, bindingTemplate, and tModel. The businessEntity structure provides information about the business or other entity seeking to publish the web service. The businessService structure provides descriptive information about a particular service or family of technical services. The bindingTemplate structure provides technical information relating to a web service's entry points and contains a reference to the tModel. The TModel contains technical details for the service.

Two of these UDDI data structures are particularly relevant to the use of WSDL to form SOAP requests for publication to a UDDI registry: the tModel, which is also discussed above in the Background section, and the businessService. TModels, often referred to as "service type definitions", are used to describe compliance with a specification, a concept, or a shared design. TModels have various uses in UDDI registries. In the case of mapping WSDL-described web services, tModels have two uses. First, tModels are used to represent technical specifications, such as service types, bindings, and wire protocols, and references to WSDL documents representing a description of the service interface, which are used by a web service requestor to "bind" to the web service. Second, tModels are used to implement category systems that are used to categorize technical specifications and services.

When a particular specification is registered in the UDDI registry as a tModel, it is assigned a unique key, called a tModelKey. This key is used by other UDDI entities to reference the tModel, for example to indicate compliance with the specification. Each specification tModel also contains an overviewURL, which provides the address of the specification itself, for example, a WSDL document.

Additional metadata can be associated with a specification tModel using any number of identifier and category systems. Identifiers are grouped in a construct called an identifierBag, and categories are grouped in a construct called a categoryBag. These bags contain a set of keyedReference elements. Each keyedReference specifies the tModelKey of the category system tModel and a name/value pair that specifies the metadata. For example, a keyedReference referencing the namespace category system can be used to specify a WSDL namespace. The metadata values specified in keyedReference elements (keyName and keyValue) can be used as selection criteria when searching UDDI.

In the present invention, as described above, the publication metadata extracted from the XML schema may include contextual information, such as categories and sub-categories that more specifically identify the functionality of the web service. The semantic interface 210 uses these categories and sub-categories to automatically create the categoryBag of the tModel.

Figure 10:
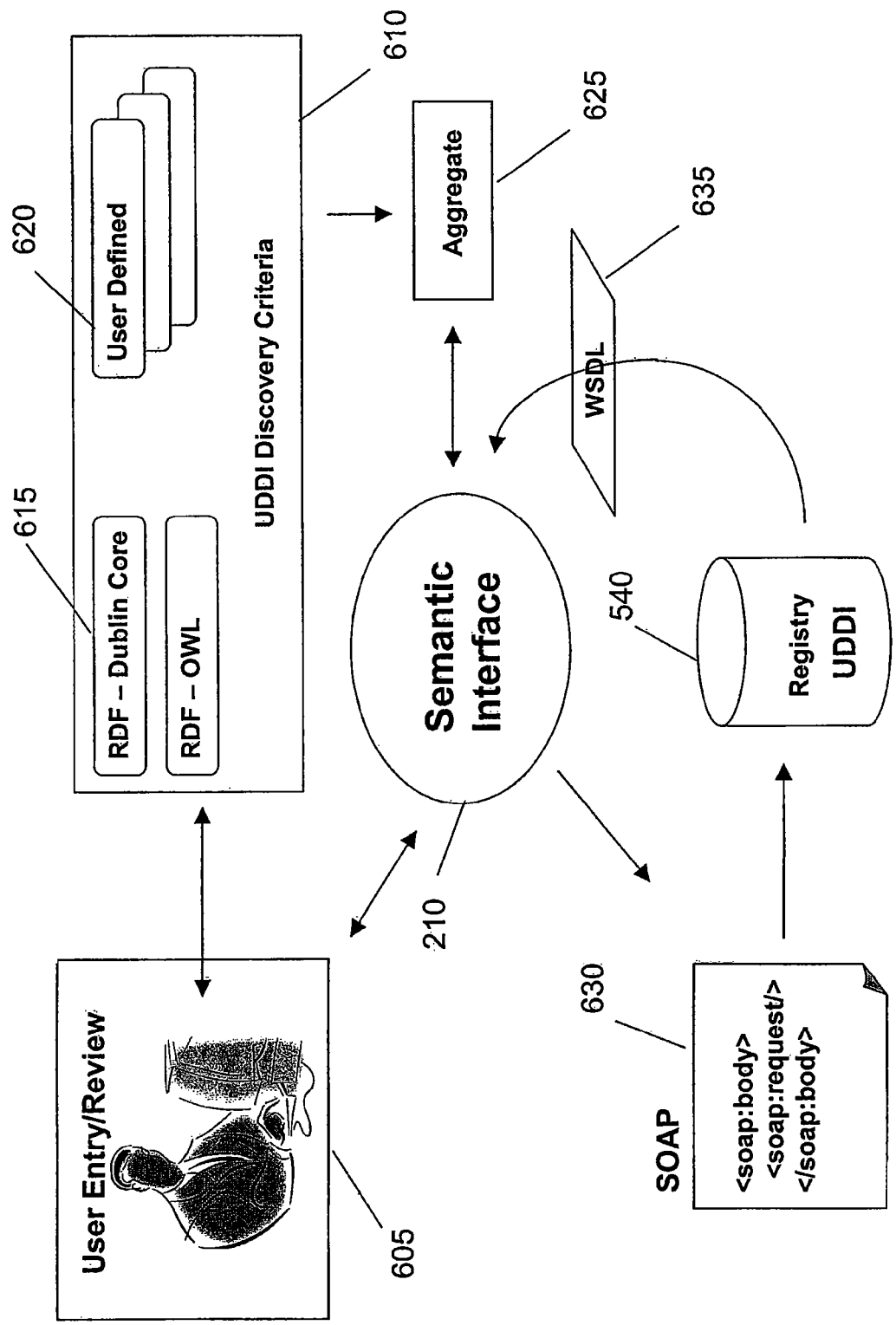
FIG. 10 is a block diagram illustrating discovery of a web service from a UDDI registry using a semantic interface in accordance with an embodiment of the present invention.

FIG. 10 shows an example of an embodiment of the present invention in which a user is preparing a UDDI discovery request using the semantic interface 210. The user enters the desired criteria 610 for the discovery request using a GUI 605. As further discussed below, the criteria may include category-based selections 615, which may be validated against industry metadata standards, e.g., RDF-OWL or RDF-Dublin Core. The criteria also may include user-defined parameters 620. These discovery criteria are aggregated 625 and formed into a UDDI discovery request in SOAP 630. The discovery request is submitted to the UDDI registry 540, which returns results meeting the criteria, e.g., web service descriptions and reference to the service interface WSDL 635.

Figure 11:
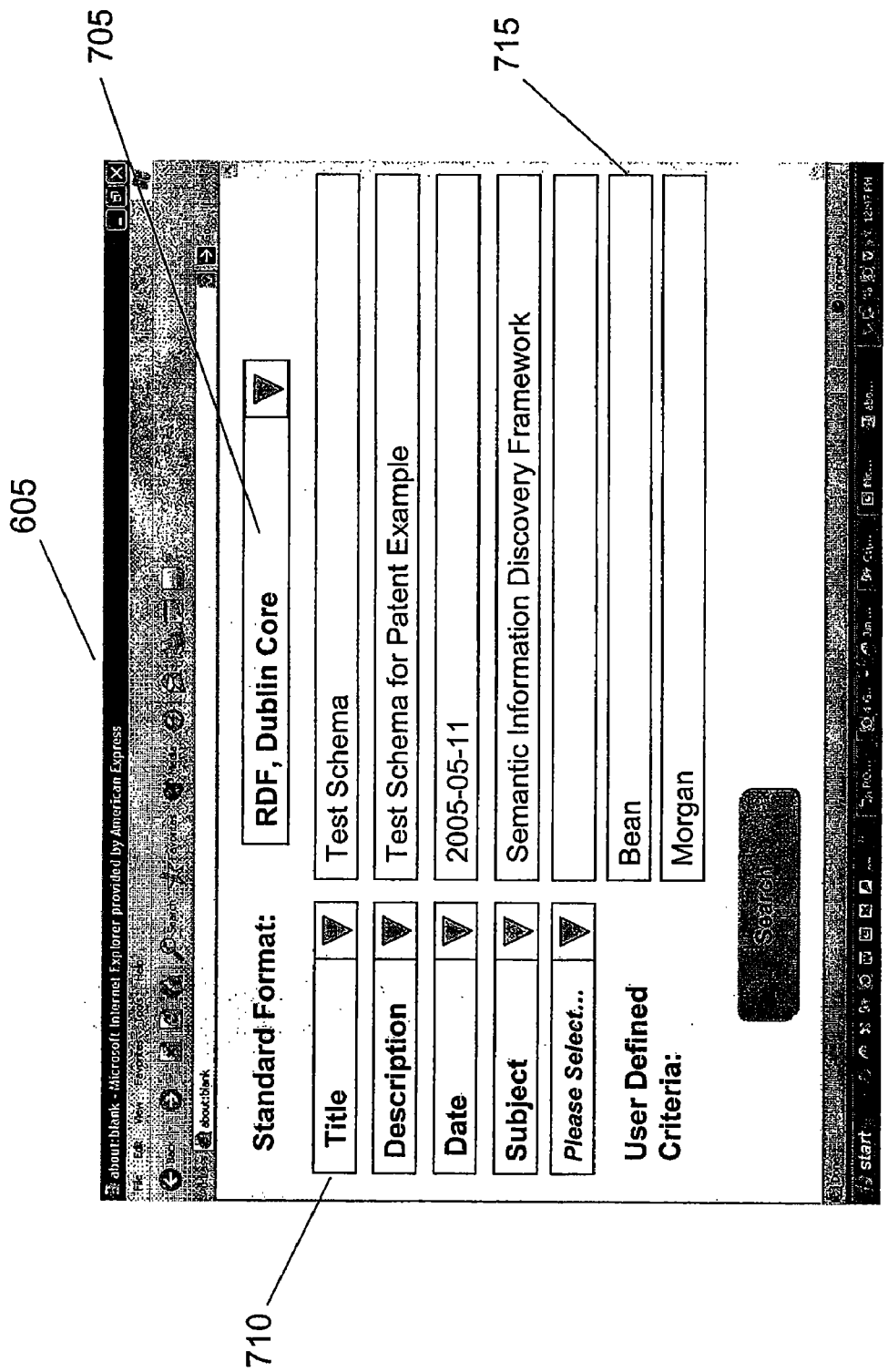
FIG. 11 illustrates a graphical user interface for entering criteria for discovery of a web service from a UDDI registry in accordance with an embodiment of the present invention.

FIG. 11 shows an example of a GUI 605 that may be used to accept input of UDDI discovery criteria by the user. For the semantic-based criteria, the user may select a semantic standard using a menu 705, e.g., RDF-Dublin Core. Based on that selection, a number of predefined categories are made available in a series of menus 710 or other sort of selection mechanism, such as check boxes. For example, under the RDF-Dublin Core standard, the user may select categories such as Title, Description, Date, Subject, etc. The GUI also provides areas 715 for the user to enter user-defined criteria.

Figure 12:
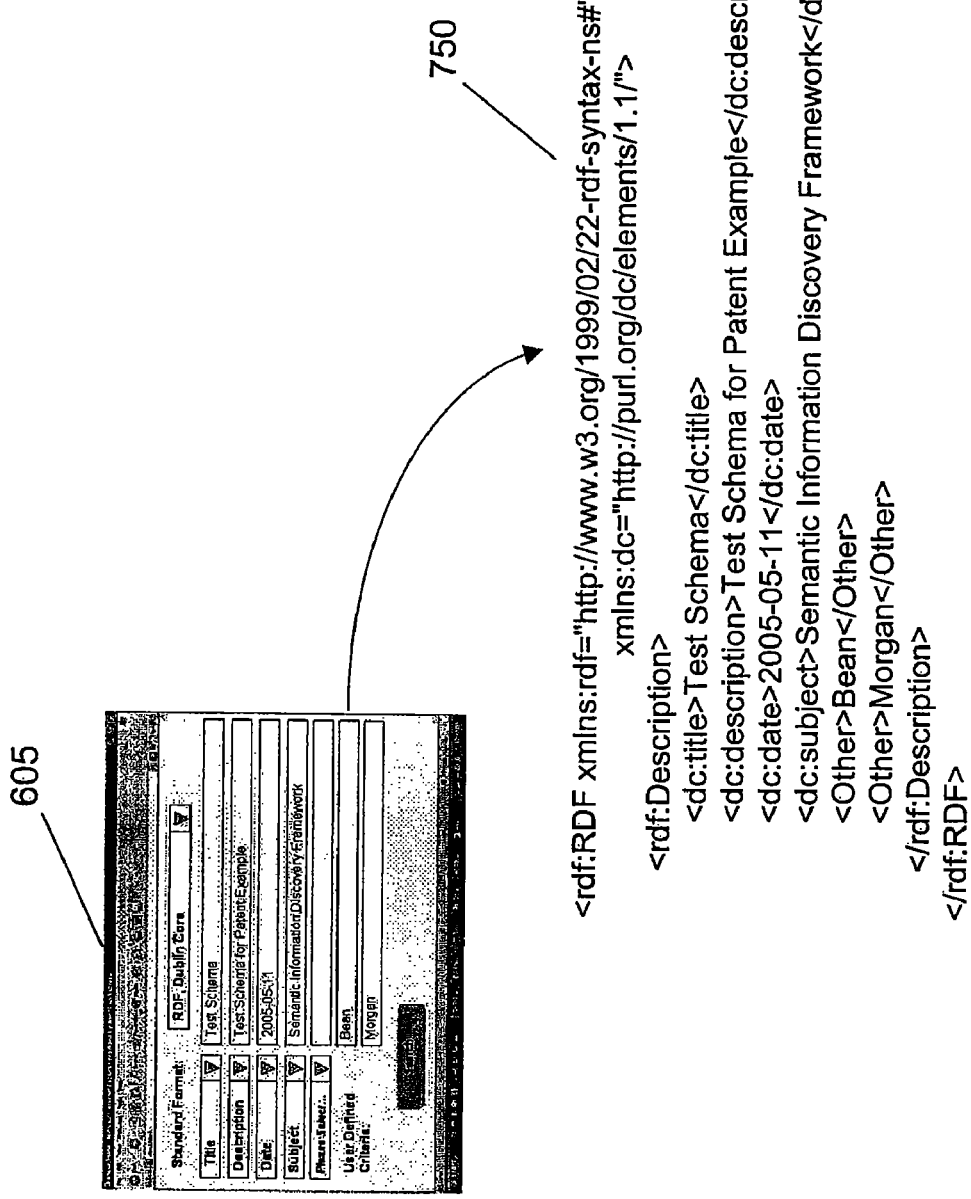
FIG. 12 illustrates the formation of a UDDI discovery request from criteria entered using the GUI of FIG. 11.
Figure 13:
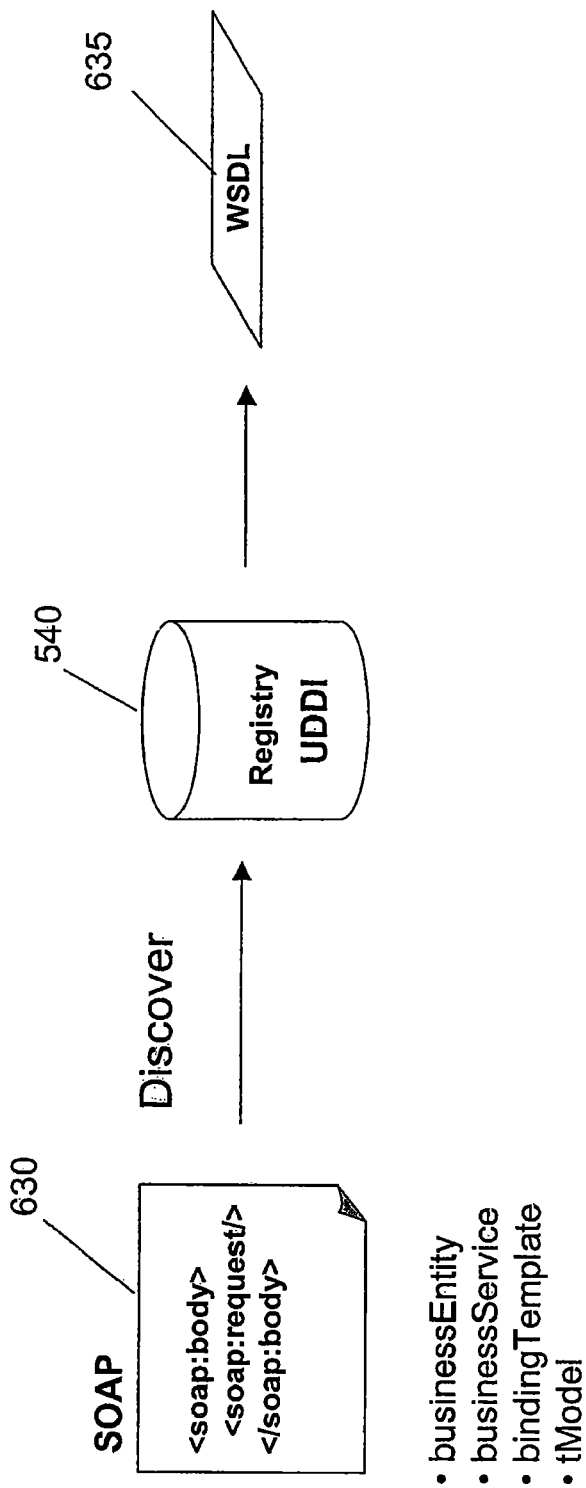
FIG. 13 is a block diagram illustrating the submission of a discovery request to a UDDI registry using SOAP, the request resulting in WSDL web service descriptions, in accordance with an embodiment of the present invention.

As illustrated in FIGS. 12 and 13, the criteria entered by the user using the GUI 605 are aggregated and used to generate a UDDI discovery request. In the example of FIGS. 12 and 13, the discovery request is based on a RDF-compliant framework, that is then formatted to the UDDI discovery (find) APIs 750 that is enveloped in SOAP 630 and submitted to the UDDI registry 540. The registry 540 returns web service descriptions and WSDL references meeting the criteria 635.

The present invention (i.e., system 200 and processes 300 and 400 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general-purpose digital computers or similar devices.

Figure 14:
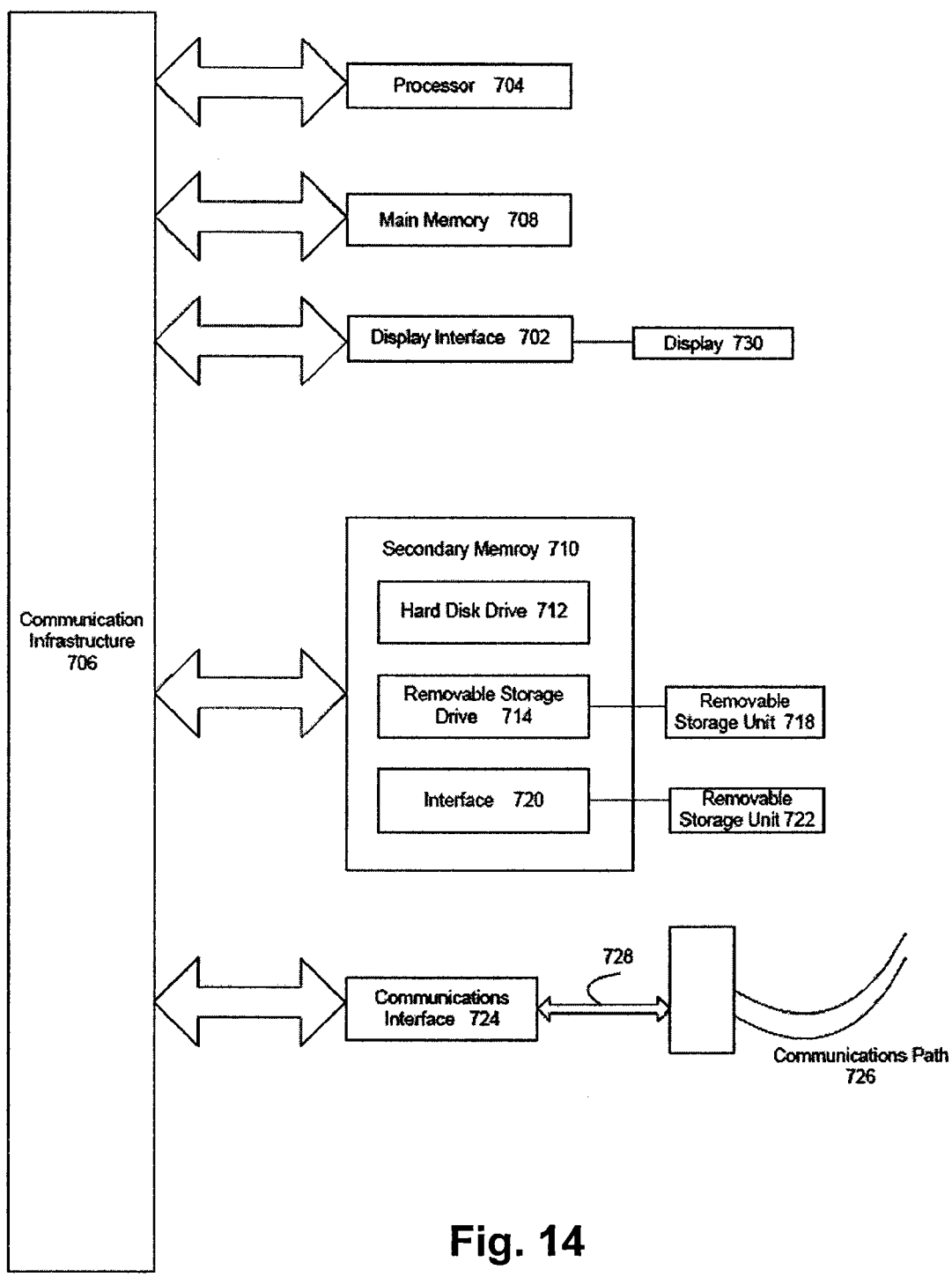
FIG. 14 is a block diagram of an exemplary computer system useful for implementing the present invention.

In fact, in one embodiment, the invention is directed toward one or more computer systems capable of carrying out the functionality described herein. An example of a computer system 700 is shown in FIG. 14.

The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for publishing a web service to a web service registry, the method comprising:
retrieving a web service description;
acquiring a schema associated with the web service description;
extracting publication metadata relating to the web service from the schema;
generating a web service registry publication request based on the publication metadata extracted from the schema; and
submitting the web service registry publication request to the web service registry for publication.

2. The method of claim 1, wherein the web service registry is a universal description, discovery and integration (UDDI) registry.

3. The method of claim 1, further comprising validating the publication metadata against a predefined semantic standard, prior to the generation of the web service registry publication request.

4. The method of claim 3, wherein the semantic standard is based on resource description framework (RDF).

5. The method of claim 3, wherein the semantic standard is based on web ontology language (OWL).

6. The method of claim 1, further comprising presenting the web service registry publication request to a user for review and editing, prior to the submission to the web service registry.

7. The method of claim 1, wherein the schema is an extensible markup language (XML) schema.

8. The method of claim 7, further comprising determining a value of a user-defined parameter, wherein the publication metadata is extracted from the XML schema based on the user-defined parameter from a corresponding one of a plurality of levels defined by the XML schema.

9. The method of claim 8, wherein the levels defined by the XML schema comprise:
(a) an annotation/appinfo schema level;
(b) an annotation/documentation schema level;
(c) a schema adjunct framework level;
(d) an annotation/appinfo container level;
(e) an annotation/documentation container level; and
(f) a discrete type-description.

10. An apparatus for publishing a web service to a web service registry, the apparatus comprising:
means for retrieving a web service description;
means for acquiring a schema associated with the web service description;
means for extracting publication metadata relating to the web service from the schema;
means for generating a web service registry publication request based on the publication metadata extracted from the schema; and
means for submitting the web service registry publication request to the web service registry for publication.

11. The apparatus of claim 10, wherein the web service registry is a universal description, discovery and integration (UDDI) registry.

12. The apparatus of claim 10, further comprising means for validating the publication metadata against a predefined semantic standard, prior to the generation of the web service registry publication request.

13. The apparatus of claim 12, wherein the semantic standard is based on resource description framework (RDF).

14. The apparatus of claim 12, wherein the semantic standard is based on web ontology language (OWL).

15. The apparatus of claim 10, further comprising means for presenting the web service registry publication request to a user for review and editing, prior to the submission to the web service registry.

16. The apparatus of claim 10, wherein the schema is an extensible markup language (XML) schema.

17. The apparatus of claim 16, further comprising means for determining a value of a user-defined parameter, wherein the publication metadata is extracted from the XML schema based on the user-defined parameter from a corresponding one of a plurality of levels defined by the XML schema.

18. The apparatus of claim 17, wherein the levels defined by the XML schema comprise:
(a) an annotation/appinfo schema level;
(b) an annotation/documentation schema level;
(c) a schema adjunct framework level;
(d) an annotation/appinfo container level;
(e) an annotation/documentation container level; and
(f) a discrete type-description.

19. A computer program product comprising a computer usable medium having control logic stored therein for causing a computer to assist a user in publishing a web service to a web service registry, said control logic comprising:
i) first computer readable program code for retrieving a web service description;
ii) second computer readable program code for acquiring a schema associated with the web service description;
iii) third computer readable program code for extracting publication metadata relating to the web service from the schema;
iv) fourth computer readable program code for generating a web service registry publication request based on the publication metadata extracted from the schema; and
v) fifth computer readable program code for submitting the web service registry publication request to the web service registry for publication.

20. The computer program product of claim 19, wherein the web service registry is a universal description, discovery and integration (UDDI) registry.

21. The computer program product of claim 19, further comprising vi) sixth computer readable program code for validating the publication metadata against a predefined semantic standard, prior to the generation of the web service registry publication request.

22. The computer program product of claim 21, wherein the semantic standard is based on resource description framework (RDF).

23. The computer program product of claim 21, wherein the semantic standard is based on web ontology language (OWL).

24. The computer program product of claim 19, further comprising vii) seventh computer readable program code for presenting the web service registry publication request to a user for review and editing, prior to the submission to the web service registry.

25. The computer program product of claim 19, wherein the schema is an extensible markup language (XML) schema.

26. The computer program product of claim 25, further comprising viii) eighth computer readable program code for determining a value of a user-defined parameter, wherein the publication metadata is extracted from the XML schema based on the user-defined parameter from a corresponding one of a plurality of levels defined by the XML schema.

27. The computer program product of claim 26, wherein the levels defined by the XML schema comprise:
    (a) an annotation/appinfo schema level;
    (b) an annotation/documentation schema level;
    (c) a schema adjunct framework level;
    (d) an annotation/appinfo container level;
    (e) an annotation/documentation container level; and
    (f) a discrete type-description.

* * * * *